United States Patent
Okamoto et al.

(10) Patent No.: US 10,895,189 B2
(45) Date of Patent: Jan. 19, 2021

(54) CATALYST DETERIORATION DIAGNOSIS METHOD AND CATALYST DETERIORATION DIAGNOSIS SYSTEM

(71) Applicant: NGK INSULATORS, LTD., Aichi (JP)

(72) Inventors: Taku Okamoto, Nagoya (JP); Osamu Nakasone, Inabe (JP); Kosuke Monna, Frankfurt am Main (DE)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 16/555,003

(22) Filed: Aug. 29, 2019

(65) Prior Publication Data

US 2020/0080460 A1 Mar. 12, 2020

(30) Foreign Application Priority Data

Sep. 7, 2018 (JP) .................................. 2018-167736

(51) Int. Cl.
*F01N 11/00* (2006.01)
*F02D 41/14* (2006.01)

(52) U.S. Cl.
CPC .......... *F01N 11/002* (2013.01); *F01N 11/007* (2013.01); *F02D 41/1441* (2013.01); *F01N 2550/02* (2013.01); *F01N 2550/03* (2013.01); *F01N 2560/025* (2013.01); *F01N 2560/06* (2013.01)

(58) Field of Classification Search
CPC ................. F01N 11/002; F01N 11/007; F01N 2560/025; F01N 2550/03; F01N 2560/06; F01N 2550/02; F02D 41/1441
See application file for complete search history.

(56) References Cited

FOREIGN PATENT DOCUMENTS

| JP | 2004-138486 A | 5/2004 |
| JP | 2010-001781 A | 1/2010 |
| JP | 2012-219740 A | 11/2012 |

OTHER PUBLICATIONS

Unexamined U.S. Appl. No. 16/555,005, filed Aug. 29, 2019.

*Primary Examiner* — Brandon D Lee
(74) *Attorney, Agent, or Firm* — Mattingly & Malur, PC

(57) ABSTRACT

A catalyst deterioration diagnosis method is a method for a system. The system includes a gas sensor having ammonia interference property that measures an air-fuel ratio and nitrogen oxide concentration of an exhaust gas that has passed through a catalyst. Monitoring of temporary increase of nitrogen oxide concentration to be detected by the gas sensor is started, and thereby a temporarily increased amount of the nitrogen oxide concentration is acquired. The monitoring is started when a fuel injection device restarts fuel injection after a fuel cut in a case where an air-fuel ratio most recently obtained by the gas sensor is larger than a predetermined threshold air-fuel ratio. The predetermined threshold air-fuel ratio is larger than a stoichiometric air-fuel ratio. Whether or not the temporarily increased amount is larger than a threshold amount is determined.

14 Claims, 7 Drawing Sheets

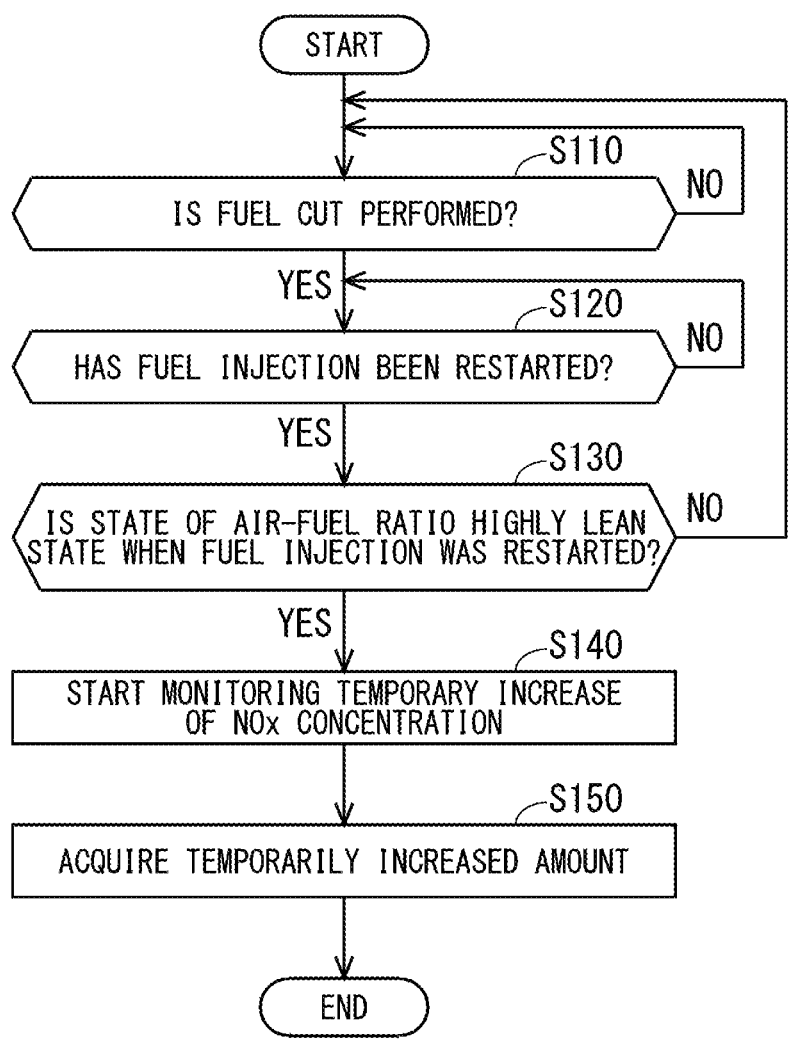
F I G. 3

CATALYST DETERIORATION DIAGNOSIS METHOD AND CATALYST DETERIORATION DIAGNOSIS SYSTEM

CROSS-REFERENCE TO RELATED APPLICATION

The present application claims priority from Japanese application JP2018-167736, filed on Sep. 7, 2018, the contents of which is hereby incorporated by reference into this application.

BACKGROUND OF THE INVENTION

Field of the Invention

The present invention relates to a catalyst deterioration diagnosis method and a catalyst deterioration diagnosis system, and more particularly to a catalyst deterioration diagnosis method and a catalyst deterioration diagnosis system for a catalyst into which an exhaust gas from an internal combustion engine is introduced.

Description of the Background Art

A gasoline engine emits an exhaust gas containing toxic substances, namely, nitrogen oxide (NOx), total hydrocarbon (THC), and carbon monoxide (CO). A catalyst that collectively removes these three contained substances, i.e., a three way catalyst (TWC), is mounted in many gasoline engine vehicles. The three way catalyst has a honeycomb structure. The honeycomb structure mainly includes a part made of ceramics of ceria ($CeO_2$), and a part made of precious metal such as platinum (Pt), palladium (Pd), and rhodium (Rh). Pt and Pd are mainly used to change HC and CO into carbon dioxide ($CO_2$) and water ($H_2O$) through oxidation. Rh is mainly used to reduce NOx. Ceria is used to cause absorption and elimination of oxygen ($O_2$).

A TWC for a gasoline engine is required to store oxygen, which is necessary for oxidizing HC and CO, while an oxygen content in an exhaust gas is high. This is because a gasoline engine is operated mainly with reference to a stoichiometric state and therefore an exhaust gas from a gasoline engine usually has a low oxygen content, unlike an exhaust gas from a diesel engine.

Operation in a stoichiometric state, in other words, is operation when an air-fuel ratio, i.e., air/fuel (A/F), is approximately 14.6. In this case, a volume of air to be introduced into a cylinder is set based on an assumption that a fuel introduced into an engine cylinder is completely burned. Specifically, a volume of air to be introduced into a cylinder is set based on an assumption that carbon (C) and hydrogen (H) are completely oxidized through complete combustion. In actual driving, A/F is subject to fine adjustment around A/F=approximately 14.6. A state in which A/F is set to a relatively high value is referred to as a "lean" state. In the lean state, an exhaust gas from an engine contains a relatively large amount of oxygen. An opposite state is referred to as a "rich" state. In a gasoline engine, fine control of a lean state and a rich state is performed, with reference to a stoichiometric state.

Removal performance of a TWC with regard to NOx is relatively high during rich operation (in a reduced atmosphere), and is relatively low during lean operation (in an atmosphere with excessive oxygen). This is because an oxygen content in an exhaust gas is low during rich operation, and therefore NOx can be easily reduced during rich operation. Conversely, removal performance of a TWC with regard to HC and CO is relatively high during lean operation, and is relatively low during rich operation. This is because an oxygen content in an exhaust gas during lean operation is high, and therefore HC and CO can be easily oxidized during lean operation. There are various cases of deterioration in removal performance of a TWC. Some of main deterioration modes include overall removal efficiency reduction in a rich state and a lean state, removal efficiency reduction in a lean state, and removal efficiency reduction in a rich state.

In recent years, on-board diagnostics (OBD) is in some cases conducted on a vehicle (typically, an automobile), as required by law. According to OBD, a diagnosis for a malfunction is conducted by means of functions provided in a vehicle itself. When a malfunction is detected, a driver may be warned.

OBD for a TWC may be conducted with an oxygen storage capacity (OSC) method, for example. In the OSC method, a specific surface area of ceria in a TWC is indirectly measured by using $O_2$ sensors provided on an upstream side and a downstream side of a TWC. An air/fuel (A/F) sensor of a limiting current type is usually provided on an upstream side of a TWC, i.e., at a position between an engine and a TWC, in order to measure an air-fuel ratio. The A/F sensor of a limiting current type is a type of $O_2$ sensor. An $O_2$ sensor of a voltage type is usually provided on a downstream side of a TWC, i.e., at a position between a TWC and an exhaust port.

In the OSC method, from a stoichiometric state to each of a lean state and a rich state, changes larger than those in usual cases are made. When an engine is brought into a lean state, oxygen concentration in an exhaust gas is increased. An $O_2$ sensor on an upstream side of a TWC starts to detect such concentration change in no time. At this time point, an $O_2$ sensor on a downstream side of the TWC is still detecting a stoichiometric state or a rich state. This is because ceria in the TWC absorbs oxygen in the exhaust gas. Since ceria can absorb a limited amount of oxygen, the $O_2$ sensor on a downstream side of the TWC also starts to detect the lean state after the elapse of a certain period of the lean state of the engine. After that, when the engine is brought into a rich state, the $O_2$ sensor on an upstream side of the TWC detects such change in no time. At this time point, the $O_2$ sensor on a downstream side of the TWC is still detecting the lean state. This is because ceria in the TWC releases oxygen. Since ceria releases a limited amount of oxygen, the $O_2$ sensor on a downstream side of the TWC also starts to detect the rich state after the elapse of a certain period of the rich state of the engine. After that, the engine is brought into a lean state again. Through such repeated state changes between a lean state and a rich state in the engine, time representing a difference in detection results of a rich state and a lean state between the $O_2$ sensor on an upstream side and the $O_2$ sensor on a downstream side is detected. Based on the detected time and a gas flow rate, a maximum value for an oxygen absorption amount of ceria is estimated. Based on the estimation, whether or not OSC of ceria is deteriorated is determined. When it is determined that OSC of ceria is deteriorated, a diagnosis result suggesting that the TWC is deteriorated is produced in OBD.

In a TWC, deterioration of a ceria part and deterioration of a precious metal part do not necessarily occur in a similar degree. Ceria is a promoter, and toxic substances (in particular, NOx) are removed mainly by precious metal. Therefore, to conduct a deterioration diagnosis of a TWC with high accuracy, it is desirable that deterioration of a precious metal part be more accurately evaluated. According to the OSC method described above, measurement is performed with regard to a ceria part, and is not performed with regard to a precious metal part. This may increase an error in estimating performance of a TWC, in particular a NOx removal rate.

Further, the OSC method is liable to be affected by a measurement error caused due to deterioration of the $O_2$ sensors on an upstream side and a downstream side of a TWC. Particularly, when the $O_2$ sensor on a downstream side of a TWC is of a voltage type, a difference may be produced in determination about a rich state and a lean state, due to hydrogen or the like adhering to a sensor electrode. Such a difference is liable to be affected by a composition of gasoline or engine oil, and therefore coping with the difference through correction is difficult. A determination error about a rich state and a lean state directly leads to a diagnosis error of the OSC method. Further, the $O_2$ sensor on a downstream side may wrongly determine that a state is closer to a rich state than an actual state, under influence of hydrogen or the like generated in a TWC. Further, when the engine is stopped for a long period, a large amount of $CO_2$ may be absorbed into a site where $O_2$ is supposed to be absorbed. When a diagnosis is started in a state where the absorbed $CO_2$ is not sufficiently eliminated after the engine is started, a diagnosis error is increased. Further, when an intake air volume of the engine is large, a ratio of oxygen not absorbed into ceria in the entire oxygen in the intake air is large. Therefore, an error in estimating OSC may be increased. This is more liable to be seen as a problem particularly when exhaust gas recirculation (EGR) is used. Reduction in an absorption rate of $O_2$ is also affected by a temperature of an exhaust gas, which may lead to an error in estimating OSC.

Further, in the OSC method, there are limited opportunities where conditions (such as an intake air volume, a temperature of an exhaust gas, and an engine speed) suited for a diagnosis are satisfied. Specifically, a diagnosis cannot be conducted with sufficient accuracy unless an engine speed is kept high in a certain degree and a vehicle speed is kept substantially constant (e.g., 60 km/h to 90 km/h) for a certain period of time. Meanwhile, for example, in use monitor performance ratios (IUPR) are recommended in some cases. IUPR are such ratios that a diagnosis is properly conducted in three or more times of driving, when ten times of driving are performed. The OSC method described above may not satisfy required IUPR.

As a method for solving the various problems described above, a method of more directly evaluating removal performance is considered. Specifically, a method of measuring a NOx amount on a downstream side of a TWC to estimate a degree of removal of NOx is considered.

According to Japanese Patent Application Laid-Open No. 2010-1781, valve overlap is changed in order to change NOx concentration in an exhaust gas to be supplied to a TWC. Then, deterioration of a catalyst is determined, based on an overlap amount at the time point when an output from a sensor on a downstream side of the TWC reaches a predetermined value. Accordingly, in this method, engine control intended for OBD is performed separately from driving operation of a driver. In other words, active OBD is performed. Active OBD is not preferable from a viewpoint of drivability. Further, a driving state (such as an intake air volume, a temperature of an exhaust gas, and an engine speed) in which such active OBD can be applied is strictly limited, and thus opportunities to conduct a diagnosis are also strictly limited. Therefore, another OBD method is desirable.

Japanese Patent Application Laid-Open No. 2012-219740 discloses a removal performance evaluation method of a catalyst. Specifically, an engine is operated such that an exhaust gas having a rich air-fuel ratio is supplied to a catalyst when an air-fuel ratio of an atmosphere where the catalyst is placed is lean and when the catalyst is within a predetermined temperature range in which the catalyst exhibits catalyst activity. In this state, a NOx removal rate, which is a time-dependent change rate of a NOx concentration reduction amount on a downstream side of a catalyst, is calculated. Further, a NOx removal amount, which is an integrated value of a NOx concentration reduction amount in a predetermined period, is calculated. Based on the NOx removal rate and the NOx removal amount, deterioration of the catalyst is evaluated. In this method, NOx concentration is detected by a NOx sensor.

Japanese Patent Application Laid-Open No. 2004-138486 discloses a NOx sensor that can detect an air-fuel ratio as well as NOx concentration. The NOx sensor has a layered structure made of zirconia oxide as a solid electrolyte having oxygen ion conductivity. In the layered structure, a first chamber, and a second chamber disposed on a downstream side of the first chamber are provided. A pump electrode having low reducibility with respect to NOx is formed on a surface facing the first chamber, in order to remove $O_2$ and detect an air-fuel ratio. The air-fuel ratio is calculated based on an amount of oxygen pumped by the first pump electrode. A pump electrode having high reducibility with respect to NOx is formed on a surface facing the second chamber, in order to detect NOx.

A NOx sensor widely used for an automobile as described in Japanese Patent Application Laid-Open No. 2004-138486 described above is usually subject to interference of $NH_3$. Typically, $NH_3$ is changed into NO in the first chamber of the sensor. When the changed NO is detected in the second chamber of the sensor, NOx concentration is unfavorably detected as an excessively high value. It is known that ammonia ($NH_3$) may be generated when a catalyst for purifying an exhaust gas, in particular a three way catalyst (TWC), is used. Thus, in a catalytic performance evaluation method described in Japanese Patent Application Laid-Open No. 2012-219740, $NH_3$ may be contained in an exhaust gas that has passed through a catalyst. When NOx concentration of an exhaust gas containing $NH_3$ is detected by such a NOx sensor as described above, accuracy of detecting NOx concentration may be reduced due to $NH_3$ interference property of the NOx sensor. Thus, it is difficult to evaluate performance reduction caused due to deterioration of a catalyst with high accuracy.

SUMMARY

The present invention is made in order to solve the problems as described above, and has an object to provide a catalyst deterioration diagnosis method and a catalyst deterioration diagnosis system, with which a catalyst deterioration diagnosis based on NOx concentration in an exhaust gas that has passed through a catalyst can be conducted with high accuracy.

A catalyst deterioration diagnosis method according to the present invention is a method for a system. The system includes an internal combustion engine including a fuel injection device, a catalyst into which an exhaust gas from the internal combustion engine is introduced, and a gas sensor having ammonia interference property that measures an air-fuel ratio and nitrogen oxide concentration of an exhaust gas that has passed through the catalyst. The catalyst deterioration diagnosis method includes the following steps. Monitoring of temporary increase of nitrogen oxide concentration to be detected by the gas sensor is started, and thereby a temporarily increased amount of the nitrogen oxide concentration is acquired. The monitoring is started when the fuel injection device restarts fuel injection after a fuel cut in a case where an air-fuel ratio most recently obtained by the gas sensor is larger than a predetermined threshold air-fuel ratio. The predetermined threshold air-fuel ratio is larger than a stoichiometric air-fuel ratio. Whether or not the temporarily increased amount is larger than a threshold amount is determined.

A catalyst deterioration diagnosis system according to the present invention is a system for diagnosing a degree of deterioration of a catalyst into which an exhaust gas from an internal combustion engine including a fuel injection device is introduced. The catalyst deterioration diagnosis system includes a gas sensor, and a control device. The gas sensor has ammonia interference property, and is configured to be capable of measuring an air-fuel ratio and nitrogen oxide concentration of an exhaust gas that has passed through the catalyst. The control device is configured to run the internal combustion engine. The control device includes a fuel injection controller, an air-fuel ratio determination unit, and a monitor unit. The fuel injection controller is configured to control operation of the fuel injection device. The air-fuel ratio determination unit is configured to determine whether or not an air-fuel ratio obtained by the gas sensor is larger than a predetermined threshold air-fuel ratio. The predetermined threshold air-fuel ratio is larger than a stoichiometric air-fuel ratio. The monitor unit is configured to start monitoring of temporary increase of nitrogen oxide concentration to be detected by the gas sensor, and thereby acquire a temporarily increased amount of the nitrogen oxide concentration. The monitor unit is configured to start the monitoring when the fuel injection controller gives a command of restarting fuel injection after a fuel cut to the fuel injection device in a case where a most recent determination result produced by the air-fuel ratio determination unit as to whether or not the air-fuel ratio obtained by the gas sensor is larger than the predetermined threshold air-fuel ratio suggests that the air-fuel ratio obtained by the gas sensor is larger than the predetermined threshold air-fuel ratio. The increased-amount determination unit is configured to determine whether or not the temporarily increased amount acquired by the monitor unit is larger than a threshold amount.

According to the present invention, a catalyst deterioration diagnosis based on NOx concentration in an exhaust gas that has passed through a catalyst can be conducted with high accuracy. These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flowchart schematically illustrating a process of acquiring a temporarily increased amount of NOx concentration in the catalyst deterioration diagnosis method according to the embodiment of the present invention.

DESCRIPTION OF THE PREFERRED EMBODIMENTS

An embodiment of the present invention will be described below with reference to the drawings.

(Configuration)

Figure 1:
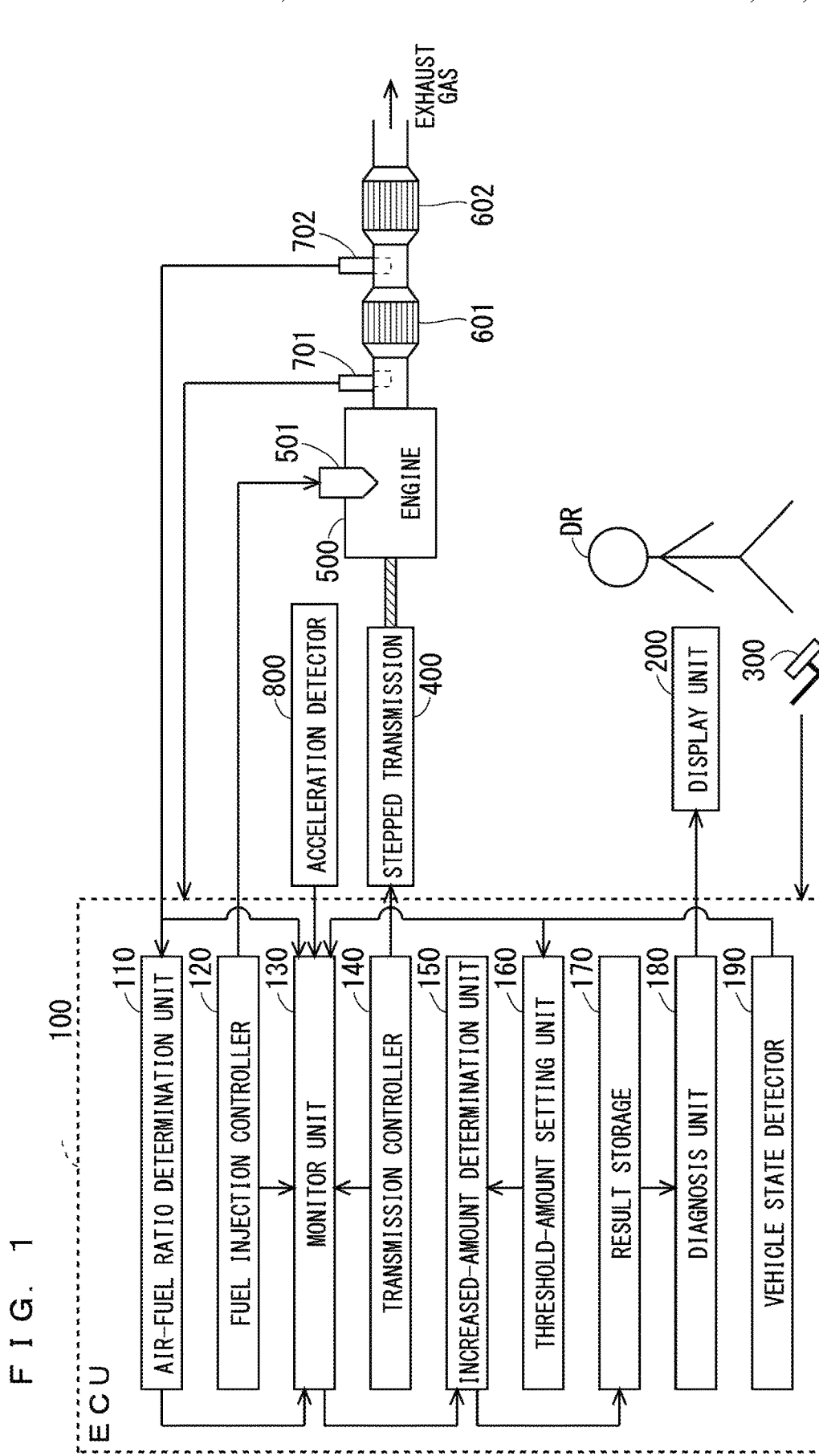
FIG. 1 is a diagram schematically illustrating a configuration of a vehicle according to an embodiment of the present invention.

FIG. 1 is a diagram schematically illustrating a configuration of a vehicle (system) according to this embodiment. In this embodiment, a vehicle is an automobile driven by a driver DR. The automobile includes a gasoline engine 500 (internal combustion engine) including a fuel injection device 501, a stepped transmission 400 connected to the gasoline engine 500, a TWC 601 (catalyst), and a catalyst degradation diagnosis system to be described later.

The vehicle may further include an accelerator pedal 300 (drive operation device) operated by the driver DR, an additional catalyst 602, an air-fuel ratio sensor 701, and an acceleration detector 800. The accelerator pedal 300 is a pedal operated by the driver DR to drive a vehicle. The additional catalyst 602 is disposed on a downstream side of the TWC 601. For example, the additional catalyst 602 is a TWC, a gasoline particulate filter (GPF), or a selective catalytic reduction (SCR) catalyst. The air-fuel ratio sensor 701 is disposed between the gasoline engine 500 and the TWC 601. The air-fuel ratio sensor 701 is mainly used for control of the gasoline engine 500. The acceleration detector 800 is a device for detecting acceleration of a vehicle. The acceleration detector 800 is any device that measures a physical quantity with which acceleration can be ultimately calculated. Note that this calculation processing may be performed outside the acceleration detector 800, or may be performed within the catalyst deterioration diagnosis system. Preferably, the acceleration detector 800 is an element that can detect a value corresponding to acceleration by itself, i.e., an acceleration sensor.

The catalyst deterioration diagnosis system is a system for diagnosing a degree of deterioration of the TWC 601, into which an exhaust gas from the gasoline engine 500 is introduced. The catalyst deterioration diagnosis system includes an electronic control unit (ECU) 100 (control device), and a gas sensor 702. The catalyst deterioration diagnosis system may further include a display unit 200. For example, the display unit 200 is a lamp or a display device.

The gas sensor 702 is a sensor that can measure an air-fuel ratio and NOx concentration of an exhaust gas that has passed through the TWC 601. The gas sensor 702 has $NH_3$ interference property with regard to measurement of NOx concentration. Specifically, when $NH_3$ is contained in a gas to be detected by the gas sensor 702, a detection value of NOx concentration is erroneously recognized as a value larger than an actual value. The $NH_3$ interference property may be caused due to the fact that $NH_3$ turns into NOx (typically, NO) through an oxidation reaction inside a sensor. The oxidation reaction may occur particularly at an electrode containing precious metal (e.g., Pt) inside the gas sensor 702.

As a typical example, the gas sensor 702 has a layered structure made of zirconia as a solid electrolyte having oxygen ion conductivity. In the layered structure, a first chamber, and a second chamber disposed on a downstream side of the first chamber are provided. A first pump electrode (e.g., an electrode containing Pt) having low reducibility with respect to NOx is provided on a surface facing the first chamber, in order to remove $O_2$ and detect an air-fuel ratio. The air-fuel ratio is calculated based on an amount of oxygen pumped by the first pump electrode. A second pump electrode (e.g., an electrode containing Rh) having high reducibility with respect to NOx is provided on a surface facing the second chamber. The second pump electrode has higher reducibility with respect to NOx than the first pump electrode. Note that an auxiliary pump electrode (e.g., an electrode containing Pt) may be additionally provided on a surface facing the second chamber, in order to reduce $O_2$ concentration in the second chamber.

In the example described above, the gas sensor 702 is a sensor of a current type. A NOx sensor of a current type is less liable to be affected by adsorption of a toxic substance. Particularly, a NOx sensor of a current type can be less affected by toxic contamination with sulfur when the NOx sensor of a current type operates in a high temperature. In contrast, for example, an $O_2$ sensor of an electromotive force type easily generates an error due to adsorption of a toxic substance.

The ECU 100 runs the gasoline engine 500. The ECU 100 includes an air-fuel ratio determination unit 110, a fuel injection controller 120, a monitor unit 130, a transmission controller 140, an increased-amount determination unit 150, a threshold-amount setting unit 160, a result storage 170, and a diagnosis unit 180. The ECU 100 may further include a vehicle state detector 190.

The ECU 100 includes an electric circuit including at least one integrated circuit (IC). The electric circuit includes at least one processor (not shown). Each function of the ECU 100 can be implemented by the processor executing software. The software is described as a program, and is stored in memory (not shown). The memory for storing the program may be included in the ECU 100. For example, the memory is non-volatile or volatile semiconductor memory.

The fuel injection controller 120 controls operation of the fuel injection device 501. The transmission controller 140 controls operation of the stepped transmission 400. The stepped transmission 400 is a power transmission mechanism that changes a transmission gear ratio in a non-continuous manner.

The air-fuel ratio determination unit 110 determines whether or not an air-fuel ratio obtained by the gas sensor 702 is larger than a threshold air-fuel ratio. The threshold air-fuel ratio may be a predetermined ratio. The threshold air-fuel ratio is larger than a stoichiometric air-fuel ratio (in this embodiment, approximately 14.6), and is preferably larger than 50. A state in which the air-fuel ratio is larger than the threshold air-fuel ratio is hereinafter also referred to as a highly lean state.

The monitor unit 130 refers to the most recent determination result produced by the air-fuel ratio determination unit 110, which suggests whether or not the air-fuel ratio obtained by the gas sensor 702 is larger than a threshold air-fuel ratio. When the fuel injection controller 120 gives a command of restarting fuel injection after a fuel cut to the fuel injection device 501 in a case where the most recent result suggests that the air-fuel ratio obtained by the gas sensor 702 is larger than a threshold air-fuel ratio, the monitor unit 130 starts monitoring temporary increase of NOx concentration to be detected by the gas sensor 702. In this manner, the monitor unit 130 acquires a temporarily increased amount of NOx concentration. For example, the temporarily increased amount is a maximum value (peak value) of NOx concentration obtained after starting the monitoring.

Preferably, when the fuel injection device 501 restarts fuel injection after a fuel cut due to downshifting of the stepped transmission 400 during deceleration of a vehicle in a case where the most recent determination result produced by the air-fuel ratio determination unit 110 suggests that the air-fuel ratio obtained by the gas sensor 702 is larger than a threshold air-fuel ratio, the monitor unit 130 starts monitoring temporary increase of NOx concentration. Whether or not a vehicle is decelerating may be determined based on a detection result of the acceleration detector 800.

The monitor unit 130 may be configured to operate only when a state of a vehicle is within a predetermined specified range. The state of a vehicle is acquired from the vehicle state detector 190.

The increased-amount determination unit 150 determines whether or not the temporarily increased amount acquired by the monitor unit 130 is larger than a threshold amount set by the threshold-amount setting unit 160. A determination result is stored in the result storage 170.

The threshold-amount setting unit 160 sets a threshold amount to be used by the increased-amount determination unit 150 in the above described manner. The threshold-amount setting unit 160 may select one amount out of a plurality of predetermined amounts. In this manner, the threshold-amount setting unit 160 may set a threshold amount. Such selection may be performed based on a state of a vehicle when the monitor unit 130 acquires the temporarily increased amount described above. The state of a vehicle is acquired from the vehicle state detector 190. For example, as a fuel injection amount is larger, a higher threshold amount may be set. Note that the threshold amount may be fixed to one value. In such a case, the selection as described above is unnecessary, and the threshold-amount setting unit 160 may be memory (storage) that simply stores one value.

The result storage 170 is memory (storage) that stores a determination result produced by the increased-amount determination unit 150. The diagnosis unit 180 diagnoses whether or not the TWC 601 is excessively deteriorated, based on the determination result stored in the result storage 170. In this case, as necessary, the diagnosis unit 180 may perform statistical processing on the stored determination result. For example, when a ratio of the number of times certain determination results are obtained to the predetermined total number of times determination results are obtained is equal to or larger than a predetermined ratio, the diagnosis unit 180 determines that the TWC 601 is excessively deteriorated. In this example, specifically, the certain determination results suggest that the temporarily increased amount is larger than the threshold amount.

The vehicle state detector 190 is a section that detects a state of a vehicle. The state of a vehicle may include a state of the gasoline engine 500, such as an intake air volume, a fuel injection amount, an engine speed, an EGR rate, and a boost pressure (in a case of a turbo engine). The state of a vehicle may further include a gear selection state of the stepped transmission 400. The above state may be detected by a sensor or the like. Alternatively, the above state may be detected with reference to a detail of a command generated in the ECU 100. For example, a fuel injection amount may be detected with reference to an output of the fuel injection controller 120, and a gear selection state may be detected with reference to an output of the transmission controller 140. Further, the state of a vehicle detected by the vehicle state detector 190 may include a state other than the above state, and may include a speed, acceleration, and a temperature of the TWC 601, for example. A vehicle speed may be detected by a speed detector (not shown). A temperature may be detected by a thermometer (not shown).

(Diagnosis Method)

Figure 2:
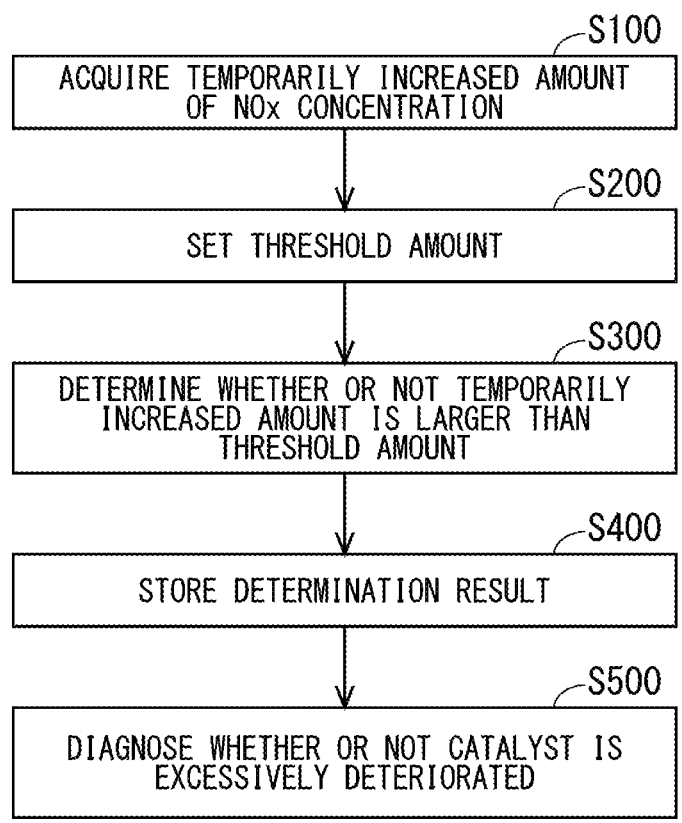
FIG. 2 is a flowchart schematically illustrating a catalyst deterioration diagnosis method according to the embodiment of the present invention.

FIG. 2 is a flowchart schematically illustrating a catalyst deterioration diagnosis method using the above catalyst deterioration diagnosis system according to this embodiment.

In Step S100, the monitor unit 130 acquires a temporarily increased amount of NOx concentration. Note that a detail of Step S100 will be described later with reference to FIG. 3.

In Step S200, the threshold-amount setting unit 160 sets a threshold amount. The threshold-amount setting unit 160 may select one amount out of a plurality of predetermined amounts. In this manner, the threshold-amount setting unit 160 may set a threshold amount. Such selection may be performed based on a state of a vehicle when the monitor unit 130 acquires the temporarily increased amount of NOx concentration. For example, as a fuel injection amount is larger, a higher threshold amount may be set. Note that the threshold amount may be fixed to one value. In such a case, the selection as described above is unnecessary.

In Step S300, the increased-amount determination unit 150 determines whether or not the temporarily increased amount is larger than the threshold amount. In Step S400, a determination result is stored in the result storage 170.

In Step S500, the diagnosis unit 180 diagnoses whether or not the TWC 601 is excessively deteriorated, based on the determination result stored in the result storage 170. In this case, as necessary, the diagnosis unit 180 may perform statistical processing on the stored determination result. Further, when the number of times of stored determination results is too small, the processing may be brought back to Step S100 from Step S500. In this manner, a determination result may be further acquired. It is preferable that a diagnosis result be displayed by the display unit 200 so as to be notified to the driver DR.

In Step S100 described above, when the fuel injection device 501 restarts fuel injection after a fuel cut in a case where an air-fuel ratio most recently obtained by the gas sensor 702 is larger than a threshold air-fuel ratio, monitoring of temporary increase of NOx concentration to be detected by the gas sensor 702 is started. In this manner, a temporarily increased amount of NOx concentration is acquired. FIG. 3 is a flowchart schematically illustrating a process for executing Step S100 (FIG. 2).

In Step S110, the monitor unit 130 determines whether or not the fuel injection device 501 is performing a fuel cut. In other words, the monitor unit 130 determines whether or not the fuel injection controller 120 has given a command of a fuel cut. If a fuel cut is not performed, the processing returns to Step S110. If a fuel cut is performed, the processing proceeds to Step S120.

In Step S120, the monitor unit 130 determines whether or not the fuel injection device 501 has restarted fuel injection. In other words, the monitor unit 130 determines whether or not the fuel injection controller 120 has restarted to give a command of fuel injection. If fuel injection is not restarted, the processing returns to Step S120 again. If fuel injection is restarted, the processing returns to Step S130.

In Step S130, the monitor unit 130 determines whether or not a state of the air-fuel ratio that the air-fuel ratio determination unit 110 most recently obtains via the gas sensor 702 is a highly lean state. In this manner, the monitor unit 130 determines whether or not a state of the air-fuel ratio is a highly lean state when the fuel injection device 501 restarted fuel injection. The state of the air-fuel ratio changes closer to a rich state due to the restart of fuel injection. By focusing on whether or not a state of the air-fuel ratio most recently obtained at the time point when fuel injection was restarted is a highly lean state, an air-fuel ratio hardly affected by the restart of fuel injection can be known. If a state of such a known air-fuel ratio is not a highly lean state, the processing returns to Step S110. If a state of such a known air-fuel ratio is a highly lean state, the processing proceeds to Step S140.

In Step S140, the monitor unit 130 starts monitoring temporary increase of NOx concentration to be detected by the gas sensor 702. Specifically, the monitor unit 130 enters a state of waiting for emergence of temporary increase of NOx concentration.

In Step S150, the monitor unit 130 acquires a temporarily increased amount of NOx concentration. For example, the temporarily increased amount is a maximum value (peak value) of NOx concentration first obtained after the monitor unit 130 started waiting for emergence of temporary increase of NOx concentration in Step S140.

Preferably, the restart of fuel injection in Step S120 described above is performed only due to downshifting of the stepped transmission 400 during deceleration of a vehicle. In this case, when the fuel injection device 501 restarts fuel injection after a fuel cut due to downshifting of the stepped transmission 400 during deceleration of a vehicle in a case where the air-fuel ratio most recently obtained by the gas sensor 702 is larger than a threshold air-fuel ratio, Step S140 described above is executed. Usually, at the time of downshifting of the stepped transmission 400 during deceleration of a vehicle, a fuel cut and restart of fuel injection followed by the fuel cut are performed, with the aim of adjusting an engine speed. Thus, opportunities to execute Step S140 described above can be obtained with high frequency, even in usual driving that is not driving intended for a diagnosis itself.

Note that Step S140 described above may be executed only when a state of a vehicle is within a predetermined specified range. If a state of a vehicle is not within the predetermined specified range, the processing may return to Step S110.

In Step S150 described above, it is preferable that the monitor unit 130 monitor temporary increase of NOx concentration to be detected by the gas sensor 702, only in a period in which the air-fuel ratio obtained by the gas sensor 702 is leaner than stoichiometry. If a temporarily increased amount of NOx concentration is not acquired in this period, the processing may return to Step S110.

(Experiment and Analysis)

Figure 4:
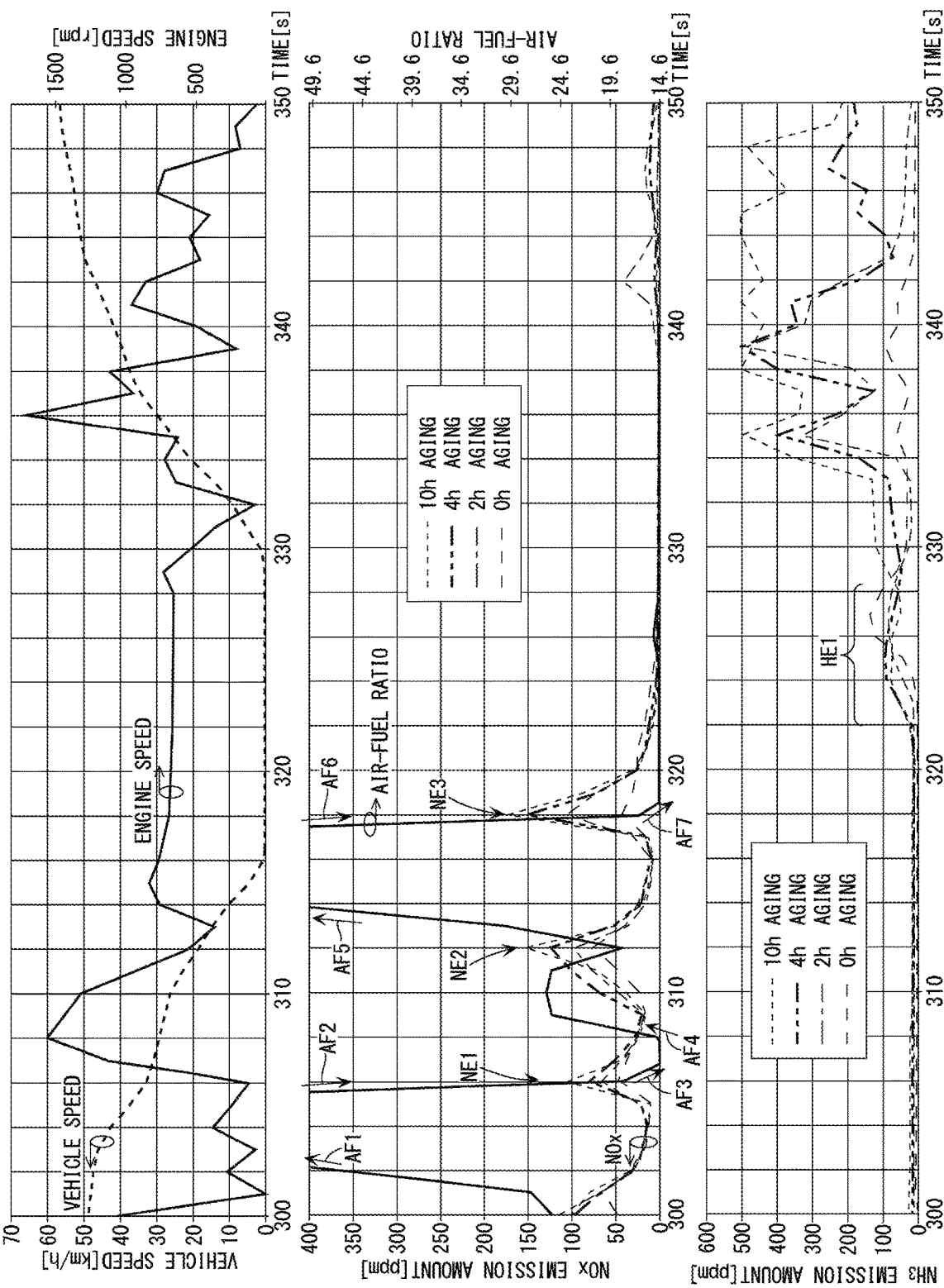
FIG. 4 is a graph showing a measurement result of a vehicle speed, an engine speed, an actual NOx emission amount, an air-fuel ratio, and an actual $NH_3$ emission amount, in a first period of an experiment using a vehicle.
Figure 5:
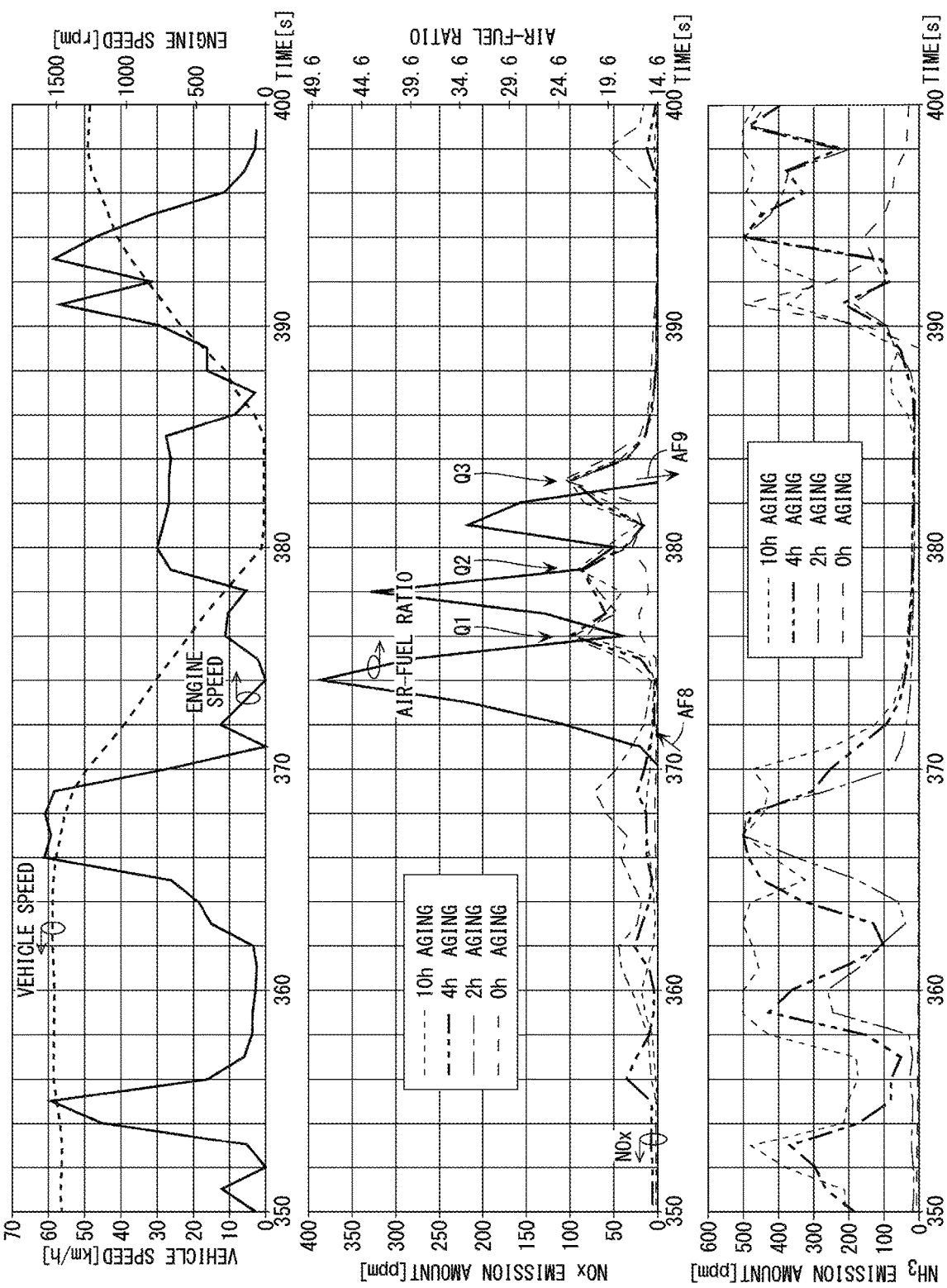
FIG. 5 is a graph showing a measurement result of a vehicle speed, an engine speed, an actual NOx emission amount, an air-fuel ratio, and an actual $NH_3$ emission amount, in a second period of the experiment using a vehicle.
Figure 6:
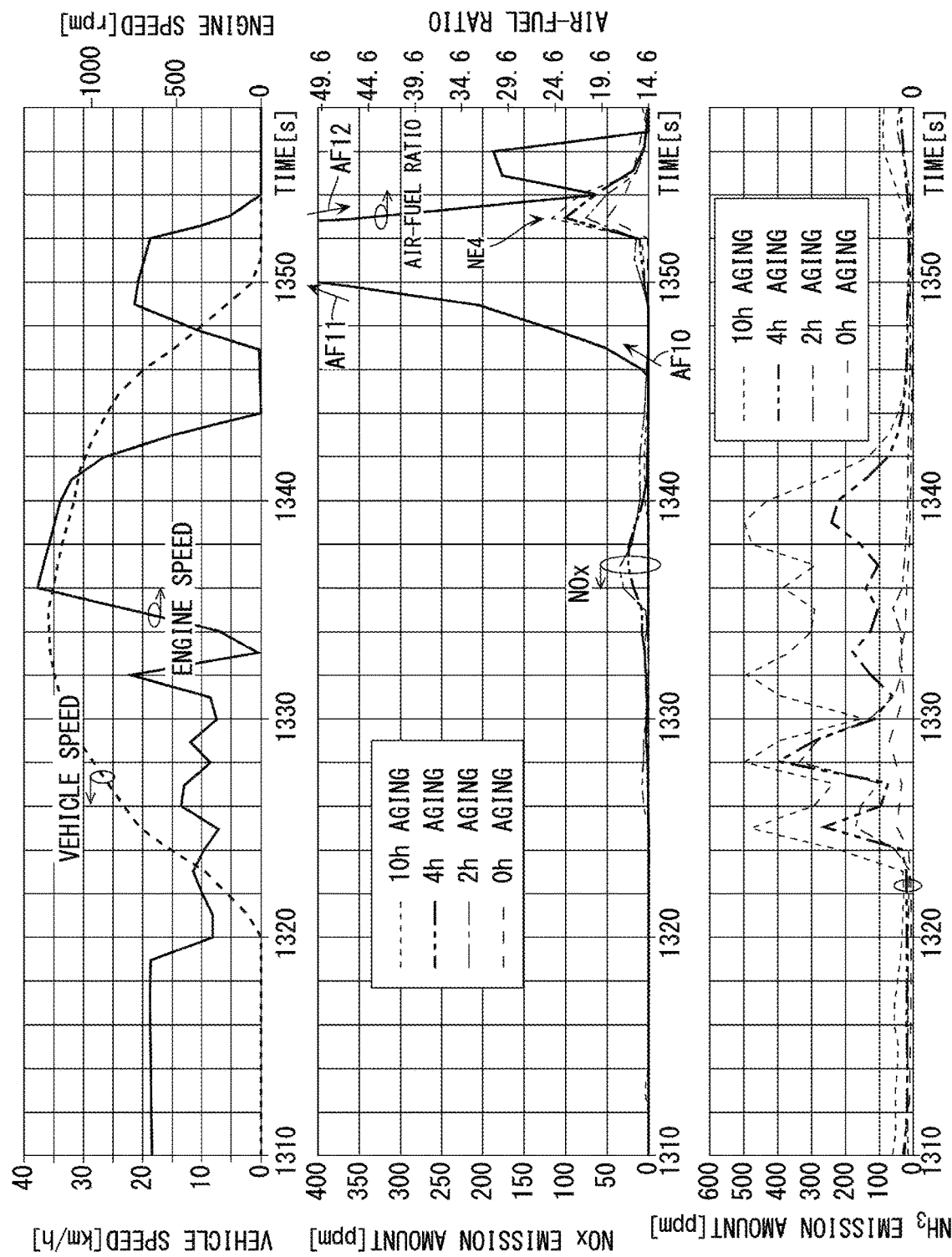
FIG. 6 is a graph showing a measurement result of a vehicle speed, an engine speed, an actual NOx emission amount, an air-fuel ratio, and an actual $NH_3$ emission amount, in a third period of the experiment using a vehicle.

FIG. 4 to FIG. 6 are each a graph showing time-dependent change of a vehicle speed, an engine speed, a NOx emission amount, an air-fuel ratio, and an $NH_3$ emission amount measured in a driving experiment (bench test) of a vehicle including the TWC 601 (FIG. 1). FIG. 4 to FIG. 6 show time-dependent change in first to third periods, respectively. Note that a sampling cycle of each piece of measured data is 1 second (half of a horizontal scale), and obtained data points are connected with a straight line in the graphs.

The NOx emission amount and the $NH_3$ emission amount shown in the graphs are not obtained by the gas sensor 702 (FIG. 1), but are obtained by a gas analyzer installed for the purpose of the experiment at a position on a downstream side of the gas sensor 702. Unlike the gas sensor 702, the gas analyzer does not have $NH_3$ interference property. Thus, the gas analyzer can invariably detect an actual NOx emission amount and an actual $NH_3$ emission amount. Note that such a gas analyzer not having $NH_3$ interference property is a measurement device for an experiment, and it is usually difficult to equip a general automobile with such a gas analyzer.

Four TWCs 601, which had been subjected to hydrothermal aging treatment of 0 h (hour), 2 h, 4 h, and 10 h, were prepared, and a driving experiment was conducted for each of the four TWCs 601. The hydrothermal aging treatment was performed in an atmosphere obtained by mixing 2% of $O_2$ and 10% of $H_2O$ into an inert gas at a temperature of 1000° C., with the use of an electric furnace. As the vehicle including the TWC 601 (FIG. 1), "Golf 7" was used. "Golf 7" is an automobile equipped with a 1.4-liter gasoline engine and a 6-speed automatic transmission, manufactured by Volkswagen in 2014. As for the TWC 601, a genuine product of "Golf 7" was used as well. As a driving mode for the driving experiment, the Federal Test Procedure-75 (FTP-75) defined by the Environmental Protection Agency (EPA) of the United States was used.

In the middle graph in each of FIG. 4 to FIG. 6, a value of an air-fuel ratio detected by the gas sensor 702 is indicated within a range between 14.6 (stoichiometry) and approximately 50. With reference to the middle graphs of FIG. 4 to FIG. 6, each of an arrow AF1, an arrow AF5, and an arrow AF11 indicates a timing when the air-fuel ratio was increased to 50 or larger. Further, each of an arrow AF2, an arrow AF6, and an arrow AF12 indicates a timing when the air-fuel ratio was reduced to less than 50. Further, each of an arrow AF3, an arrow AF7, and an arrow AF9 indicates a timing when the air-fuel ratio was reduced to 14.6 (stoichiometry) or less. Further, each of an arrow AF4, an arrow AFB, and an arrow AF10 indicates a timing when the air-fuel ratio exceeded 14.6 (stoichiometry).

Figure 7:
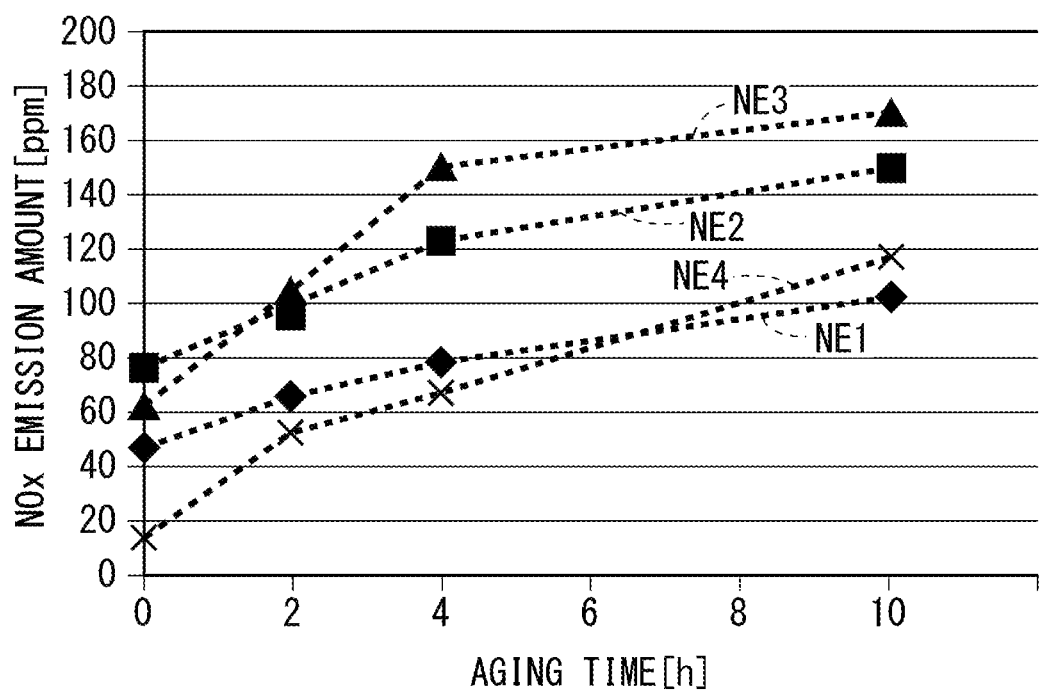
FIG. 7 is a graph showing a correlation between an actual NOx emission amount and aging time of a catalyst, in the experiment using a vehicle.

With reference to the middle graphs of FIG. 4 and FIG. 6, each of timings NE1 to NE4 corresponds to a timing before a state was changed to a rich state (air-fuel ratio <14.6) immediately after the fuel injection device 501 (FIG. 1) restarted fuel injection after a fuel cut due to downshifting during deceleration of a vehicle. At the timings NE1 to NE4, temporary increase of a NOx emission amount was detected. FIG. 7 is a graph showing a correlation between aging time and a NOx emission amount, at each of the timings NE1 to NE4. As can be understood from these results, a peak value of the NOx emission amount was largely proportional to aging time at each of the timings NE1 to NE4.

With further reference to the lowermost graphs of FIG. 4 and FIG. 6, an $NH_3$ emission amount was approximately zero at each of the timings NE1 to NE4. Thus, even when the gas sensor 702 (FIG. 1) having $NH_3$ interference property is used, values nearly as accurate as values of the gas analyzer can be detected at the timings NE1 to NE4 without being subject to interference. The table below shows a detection value (ppm) obtained by the gas analyzer and a detection signal (V) from the gas sensor 702 (FIG. 1) at the timings NE1 to NE4.

TABLE 1

|  | NOx Emission Amount [ppm] | | | | NOx Sensor Output [V] | | | |
| --- | --- | --- | --- | --- | --- | --- | --- | --- |
|  | 0 h | 2 h | 4 h | 10 h | 0 h | 2 h | 4 h | 10 h |
| NE1 | 46.3 | 65.6 | 79.0 | 103.8 | 0.22 | 0.31 | 0.38 | 0.49 |
| NE2 | 75.6 | 96.8 | 123.8 | 151.9 | 0.36 | 0.47 | 0.59 | 0.73 |
| NE3 | 62.5 | 104.8 | 150.7 | 171.7 | 0.30 | 0.50 | 0.72 | 0.82 |
| NE4 | 13.7 | 52.8 | 68.3 | 118.0 | 0.07 | 0.25 | 0.33 | 0.57 |

Based on the results above, it was found that measurement values proportional to aging time can be obtained by detecting a NOx emission amount with the gas sensor 702 (FIG. 1) at any of the timings NE1 to NE4. The timings NE1 to NE4 are timings before a state was changed to a rich state (air-fuel ratio <14.6) immediately after the fuel injection device 501 (FIG. 1) restarted fuel injection after a fuel cut due to downshifting during deceleration of a vehicle. Thus, to obtain a NOx emission amount at the timings NE1 to NE4, monitoring of temporary increase of NOx concentration may be started at the time point when the fuel injection device 501 restarts fuel injection after a fuel cut due to downshifting during deceleration of a vehicle. Timings when the NOx emission amount has a maximum value after starting monitoring correspond to the timings NE1 to NE4.

Note that, after the timing NE3, the air-fuel ratio was changed from a lean state to a rich state as indicated by the arrow AF7. Then, emission of $NH_3$ was observed as indicated by a bracket HE1 in the lowermost graph of FIG. 4. Thus, to detect NOx concentration with high accuracy by using the gas sensor 702 having $NH_3$ interference property, it is preferable that temporary increase of NOx concentration be monitored only in a period of a lean state.

With reference to FIG. 5, timings Q1 to Q3 also correspond to timings immediately after the fuel injection device restarted fuel injection after a fuel cut due to downshifting during deceleration of a vehicle. A proportional relationship between a peak value of a NOx emission amount and aging time at the timings Q1 to Q3 was not as clearly observed as that at the timings NE1 to NE4. This may be considered to result from the fact that the air-fuel ratio was not sufficiently large or a period with a relatively large air-fuel ratio was short immediately before the timings Q1 to Q3, because a period of a fuel cut immediately before the timings Q1 to Q3 was short. When the air-fuel ratio is not sufficiently large or a period with a relatively large air-fuel ratio is short, oxygen is not sufficiently absorbed into a ceria part in the TWC 601 (FIG. 1). It is presumed that such insufficient absorption lead to the reduction in a proportional relationship as described above. Accordingly, to enhance a proportional relationship between a peak value of a NOx emission amount and aging time, it is considered that a peak value of a NOx emission amount may be acquired only after a sufficiently large air-fuel ratio is detected. Changes in an air-fuel ratio do not occur instantaneously but occur continuously in a certain degree. Therefore, it is considered that oxygen absorption sufficiently proceeds even when a period in which an air-fuel ratio is equal to or larger than a threshold air-fuel ratio is short, on the condition that a threshold air-fuel ratio is sufficiently increased. According to investigation made by the inventors of the present invention, a proportional relationship can be remarkably enhanced on the condition that a threshold air-fuel ratio is increased to larger than 50.

Note that, although the air-fuel ratio immediately before the timing NE2 (FIG. 4) was smaller than the air-fuel ratio immediately before the timings Q1 to Q3, for example, the above proportional relationship is sufficiently achieved at the timing NE2. This may be considered to result from the fact that a state with a relatively high air-fuel ratio immediately before the timing NE2 continued for a long period in a certain degree (approximately 2 seconds). In consideration of this, the processing of starting monitoring of temporary increase of NOx concentration when fuel injection is restarted after a fuel cut may be caused to be performed on the condition that a state in which an air-fuel ratio obtained by the gas sensor 702 is larger than a threshold air-fuel ratio has continued for a predetermined period or more (e.g., approximately 2 seconds). In this case, it is considered that diagnosis accuracy can be maintained, and a threshold air-fuel ratio can be set to be lower.

(Effect)

According to the present embodiment, when the fuel injection device 501 restarts fuel injection after a fuel cut in a case where an air-fuel ratio most recently obtained by the gas sensor 702 is larger than a threshold air-fuel ratio, monitoring of temporary increase of NOx concentration to be detected by the gas sensor 702 is started. In this manner, a temporarily increased amount of NOx concentration is acquired. The temporarily increased amount has a correlation with deterioration of the TWC 601. Further, by setting a timing of acquiring a temporarily increased amount of NOx concentration as described above, the timing of acquiring a temporarily increased amount of NOx concentration is shifted to be different from a timing when a large amount of $NH_3$ is generated from the TWC 601. With this configuration, interference of $NH_3$ in measurement of NOx concentration is reduced, and therefore NOx concentration can be more accurately measured. Thus, a catalyst deterioration diagnosis based on NOx concentration in an exhaust gas that has passed through the TWC 601 can be conducted with high accuracy.

Generally, a fuel cut is performed at the time of deceleration in driving a vehicle, in which case a highly lean atmosphere is generated. When a fuel cut is suspended (i.e., when fuel injection is restarted), usually, control to bring the highly lean atmosphere to a rich atmosphere is performed. Such control is performed because NOx removal performance cannot be secured in a state where a catalyst absorbs a maximum amount of oxygen due to a highly lean atmosphere. The NOx removal performance can be secured by eliminating oxygen in a certain degree in a rich atmosphere. Operation of suspending a fuel cut occurs a number of times during usual driving. Particularly when downshifting is performed due to deceleration in driving, fuel injection after a fuel cut is restarted with the aim of adjusting an engine speed. Thus, a state of a vehicle suited for OBD according to this embodiment can be achieved with high frequency, without performing intentional engine control intended for OBD. Therefore, OBD according to this embodiment is suited to be applied as passive OBD, which is a type of OBD in which intentional engine control intended for OBD is not performed.

In comparison with the OSC method described above, the diagnosis according to this embodiment is based on NOx concentration, and therefore a diagnostic result more directly reflecting NOx removal performance can be obtained. Further, the diagnosis according to this embodiment can be conducted in a shorter period (typically, 1 second or less), as compared to the OSC method.

When a threshold air-fuel ratio is larger than 50, there is a higher correlation between a temporarily increased amount of NOx concentration and a degree of deterioration of the gas sensor 702. Consequently, accuracy of the catalyst deterioration diagnosis can be further enhanced. Note that a state where an air-fuel ratio is larger than 50 occurs only if a fuel cut continues for a certain period, and can thus frequently occurs in usual driving. Therefore, even when a threshold air-fuel ratio is increased to larger than 50, opportunities for OBD are not significantly lost.

Preferably, when the fuel injection device 501 restarts fuel injection after a fuel cut due to downshifting of the stepped transmission 400 during deceleration of a vehicle in a case where an air-fuel ratio most recently obtained by the gas sensor 702 is larger than a threshold air-fuel ratio, monitoring of temporary increase of NOx concentration to be detected by the gas sensor 702 is started. Downshifting of the stepped transmission 400 due to deceleration of a vehicle frequently occurs in usual driving of a vehicle. Thus, when monitoring of temporary increase of NOx concentration is started at the time of such downshifting, the catalyst deterioration diagnosis can be conducted with high frequency. Further, at the time of downshifting, usually, a fuel cut and restart of fuel injection followed by the fuel cut are performed. Thus, a fuel cut and restart of fuel injection followed by the fuel cut need not be performed solely with the aim of conducting a catalyst deterioration diagnosis. Consequently, the catalyst deterioration diagnosis can be conducted as passive OBD. Further, at the time of downshifting during deceleration, a state of a vehicle can easily achieve a state close to a predetermined state. Particularly, in an automatic transmission vehicle, downshifting during deceleration can be performed when a processor of the ECU 100 executes a specific program. Accordingly, variation in states of a vehicle at the time of OBD is relatively small. With this configuration, variation in a correlation coefficient between a temporarily increased amount of NOx concentration and a degree of deterioration of the gas sensor 702, which is caused by a difference in states of a vehicle, can be reduced. Consequently, accuracy of the catalyst deterioration diagnosis can be further enhanced.

A threshold amount to be compared to a temporarily increased amount in the increased-amount determination unit 150 may be set based on a state of a vehicle when a temporarily increased amount of NOx concentration is acquired. With this configuration, a difference in a correlation coefficient between a temporarily increased amount of NOx concentration and a degree of deterioration of the gas sensor 702, which is caused by a difference in states of a vehicle, can be corrected. Consequently, accuracy of the catalyst deterioration diagnosis can be further enhanced.

Monitoring of temporary increase of NOx concentration to be detected by the gas sensor 702 may be started only when a state of a vehicle is within a predetermined specified range. In this case, variation in a correlation coefficient between a temporarily increased amount of NOx concentration and a degree of deterioration of the gas sensor 702, which is caused by a difference in states of a vehicle, can be reduced. Consequently, accuracy of the catalyst deterioration diagnosis can be further enhanced.

It is preferable that temporary increase of NOx concentration to be detected by the gas sensor 702 be monitored, only in a period in which an air-fuel ratio obtained by the gas sensor 702 is leaner than stoichiometry. In this case, an influence of $NH_3$, which is generated after an air-fuel ratio obtained by the gas sensor 702 is changed from being lean to being rich, over the gas sensor 702 can be more securely reduced. Consequently, accuracy of the catalyst deterioration diagnosis can be further enhanced.

(Modification of Transmission)

Instead of the stepped transmission 400 (FIG. 1), a continuously variable transmission (CVT) may be used. Unlike the stepped transmission 400, the CVT is a power transmission mechanism that can change a transmission gear ratio in a continuous manner. In a vehicle including a CVT, a discrete change in a gear ratio similar to a gear change performed by the stepped transmission 400 may be implemented through control performed over the CVT by the ECU, in a manner simulating the gear change of the stepped transmission 400. Downshifting implemented with this method in such a simulating manner is herein referred to as pseudo-downshifting. Particularly, in a vehicle including paddle shifters, pseudo-downshifting can be performed in response to operation performed on the paddle shifters by the driver DR (FIG. 1).

In this modification, when the fuel injection device 501 restarts fuel injection after a fuel cut due to pseudo-downshifting of the CVT during deceleration of a vehicle in a case where the most recent determination result produced by the air-fuel ratio determination unit 110 suggests that an air-fuel ratio obtained by the gas sensor 702 is larger than a threshold air-fuel ratio, the monitor unit 130 starts monitoring temporary increase of NOx concentration. With this configuration, when the fuel injection device 501 (FIG. 1) restarts fuel injection after a fuel cut due to pseudo-downshifting during deceleration of a vehicle in a case where an air-fuel ratio most recently obtained by the gas sensor 702 (FIG. 1) is larger than a threshold air-fuel ratio, monitoring of temporary increase of NOx concentration to be detected by the gas sensor 702 is started.

According to this modification, when the fuel injection device 501 restarts fuel injection after a fuel cut due to pseudo-downshifting during deceleration of a vehicle in a case where an air-fuel ratio most recently obtained by the gas sensor 702 is larger than a threshold air-fuel ratio, monitoring of temporary increase of NOx concentration to be detected by the gas sensor 702 is started. At the time of pseudo-downshifting, usually, a fuel cut and restart of fuel injection followed by the fuel cut are performed. Thus, a fuel cut and restart of fuel injection followed by the fuel cut need not be performed solely with the aim of conducting a catalyst deterioration diagnosis. Consequently, the catalyst deterioration diagnosis method can be conducted as passive OBD.

(Other Modification)

In the embodiment described above, a catalyst deterioration diagnosis of the TWC 601 (FIG. 1) is conducted. However, in addition to or instead of the catalyst deterioration diagnosis of the TWC 601, a catalyst deterioration diagnosis of the additional catalyst 602 may be conducted with a method similar to that in the embodiment described above.

The embodiment described above gives description of a gas sensor 702 that can measure both an air-fuel ratio and NOx concentration. However, a gas sensor may include an air-fuel ratio sensor element and a NOx element having $NH_3$ interference property, which are formed separately from each other.

The embodiment described above gives description of a case where a vehicle is driven by a driver DR. However, a vehicle may be automatically driven. In such a case, the display unit 200 may be provided to display information for an occupant (not the driver DR), or the display unit 200 may be omitted. Further, when a vehicle is automatically driven, the accelerator pedal 300 may be omitted.

While the invention has been shown and described in detail, the foregoing description is in all aspects illustrative and not restrictive. It is therefore understood that numerous modifications and variations not illustrated herein can be devised without departing from the scope of the invention.

What is claimed is:

1. A catalyst deterioration diagnosis method for a system, the system including an internal combustion engine including a fuel injection device, a catalyst into which an exhaust gas from the internal combustion engine is introduced, and a gas sensor having ammonia interference property that measures an air-fuel ratio and nitrogen oxide concentration of an exhaust gas that has passed through the catalyst, the catalyst deterioration diagnosis method comprising the steps of:

starting monitoring of temporary increase of nitrogen oxide concentration to be detected by the gas sensor, and thereby acquiring a temporarily increased amount of the nitrogen oxide concentration, the monitoring being started when the fuel injection device restarts fuel injection after a fuel cut in a case where an air-fuel ratio most recently obtained by the gas sensor is larger than a predetermined threshold air-fuel ratio, the predetermined threshold air-fuel ratio being larger than a stoichiometric air-fuel ratio; and determining whether or not the temporarily increased amount is larger than a threshold amount.

2. The catalyst deterioration diagnosis method according to claim 1, wherein
the catalyst is a three way catalyst.

3. The catalyst deterioration diagnosis method according to claim 1, wherein
the predetermined threshold air-fuel ratio is larger than 50.

4. The catalyst deterioration diagnosis method according to claim 1, wherein
temporary increase of the nitrogen oxide concentration to be detected by the gas sensor is monitored, only in a period in which the air-fuel ratio obtained by the gas sensor is leaner than stoichiometry.

5. The catalyst deterioration diagnosis method according to claim 1, wherein
the system is a vehicle including a stepped transmission or a continuously variable transmission connected to the internal combustion engine, and
the monitoring of temporary increase of the nitrogen oxide concentration to be detected by the gas sensor is started when the fuel injection device restarts fuel injection after a fuel cut due to downshifting of the stepped transmission or pseudo-downshifting of the continuously variable transmission during deceleration of the vehicle in a case where the air-fuel ratio most recently obtained by the gas sensor is larger than the predetermined threshold air-fuel ratio.

6. The catalyst deterioration diagnosis method according to claim 1, wherein
the system is a vehicle, and
the catalyst deterioration diagnosis method further comprises the step of setting the threshold amount, based on a state of the vehicle when the acquiring the temporarily increased amount is performed.

7. The catalyst deterioration diagnosis method according to claim 1, wherein the system is a vehicle, and
the monitoring of temporary increase of the nitrogen oxide concentration to be detected by the gas sensor is started only when a state of the vehicle is within a predetermined specified range.

8. A catalyst deterioration diagnosis system that diagnoses a degree of deterioration of a catalyst into which an exhaust gas from an internal combustion engine including a fuel injection device is introduced, the catalyst deterioration diagnosis system comprising:
a gas sensor having ammonia interference property, and being configured to be capable of measuring an air-fuel ratio and nitrogen oxide concentration of an exhaust gas that has passed through the catalyst; and
a control device configured to run the internal combustion engine, the control device comprising:
a fuel injection controller configured to control operation of the fuel injection device;
an air-fuel ratio determination unit configured to determine whether or not an air-fuel ratio obtained by the gas sensor is larger than a predetermined threshold air-fuel ratio, the predetermined threshold air-fuel ratio being larger than a stoichiometric air-fuel ratio;
a monitor unit configured to start monitoring of temporary increase of nitrogen oxide concentration to be detected by the gas sensor, and thereby acquire a temporarily increased amount of the nitrogen oxide concentration, the monitor unit being configured to start the monitoring when the fuel injection controller gives a command of restarting fuel injection after a fuel cut to the fuel injection device in a case where a most recent determination result produced by the air-fuel ratio determination unit as to whether or not the air-fuel ratio obtained by the gas sensor is larger than the predetermined threshold air-fuel ratio suggests that the air-fuel ratio obtained by the gas sensor is larger than the predetermined threshold air-fuel ratio; and
an increased-amount determination unit configured to determine whether or not the temporarily increased amount acquired by the monitor unit is larger than a threshold amount.

9. The catalyst deterioration diagnosis system according to claim 8, wherein
the catalyst is a three way catalyst.

10. The catalyst deterioration diagnosis system according to claim 8, wherein
the predetermined threshold air-fuel ratio is larger than 50.

11. The catalyst deterioration diagnosis system according to claim 8, wherein
the monitor unit monitors temporary increase of the nitrogen oxide concentration to be detected by the gas sensor, only in a period in which the air-fuel ratio obtained by the gas sensor is leaner than stoichiometry.

12. The catalyst deterioration diagnosis system according to claim 8, wherein
the catalyst deterioration diagnosis system is a system for a vehicle including a stepped transmission or a continuously variable transmission, and
the monitor unit starts the monitoring of temporary increase of the nitrogen oxide concentration when the fuel injection device restarts fuel injection after a fuel cut due to downshifting of the stepped transmission or pseudo-downshifting of the continuously variable transmission during deceleration of the vehicle in a case where the most recent determination result produced by the air-fuel ratio determination unit as to whether or not the air-fuel ratio obtained by the gas sensor is larger than the predetermined threshold air-fuel ratio suggests that the air-fuel ratio obtained by the gas sensor is larger than the predetermined threshold air-fuel ratio.

13. The catalyst deterioration diagnosis system according to claim 8, wherein
the catalyst deterioration diagnosis system is a system for a vehicle, and
the control device further comprises a threshold-amount setting unit, the threshold-amount setting unit being configured to set the threshold amount, based on a state of the vehicle when the monitor unit acquires the temporarily increased amount.

14. The catalyst deterioration diagnosis system according to claim 8, wherein
the catalyst deterioration diagnosis system is a system for a vehicle, and
the monitor unit operates only when a state of the vehicle is within a predetermined specified range.

* * * * *